United States Patent [19]
Cassimally

[11] 3,709,513
[45] Jan. 9, 1973

[54] TROLLEY CASE
[76] Inventor: Khalil Ahmad Ibrahim Cassimally, Climax, Saskatchewan, Canada
[22] Filed: Dec. 21, 1970
[21] Appl. No.: 100,033

[30] Foreign Application Priority Data

| Dec. 24, 1969 | Great Britain | 62,764/69 |
| Feb. 24, 1970 | Great Britain | 8,784/70 |
| June 12, 1970 | Great Britain | 28,541/70 |
| June 22, 1970 | Great Britain | 30,072/70 |

[52] U.S. Cl. ................................................. 280/37
[51] Int. Cl. ........................................... B62b 11/00
[58] Field of Search ................ 280/37, 38, 39, 36 R

[56] References Cited

UNITED STATES PATENTS 2,732,218   1/1956   Resch .................................. 280/38

FOREIGN PATENTS OR APPLICATIONS 867,582   8/1941   France .................................. 280/37

*Primary Examiner*—Benjamin Hersh
*Assistant Examiner*—Robert R. Song
*Attorney*—Sandoe, Hopgood & Calimafde

[57]   ABSTRACT

A collapsible trolley which in its collapsed condition can be used as a portable case and more particularly to a trolley of the type in which the wheels and a handle framework can be folded into a position in which they are compactly contained adjacent the sides of the case or into a position in which the case and the wheeled handle framework form a trolley adapted to receive and support additional cases or luggage.

7 Claims, 7 Drawing Figures

PATENTED JAN 9 1973 3,709,513

INVENTOR
KHALIL A. I. CASSIMALLY

BY
Sandoe, Hopgood & Calimafde
ATTORNEYS

PATENTED JAN 9 1973 3,709,513
SHEET 2 OF 2
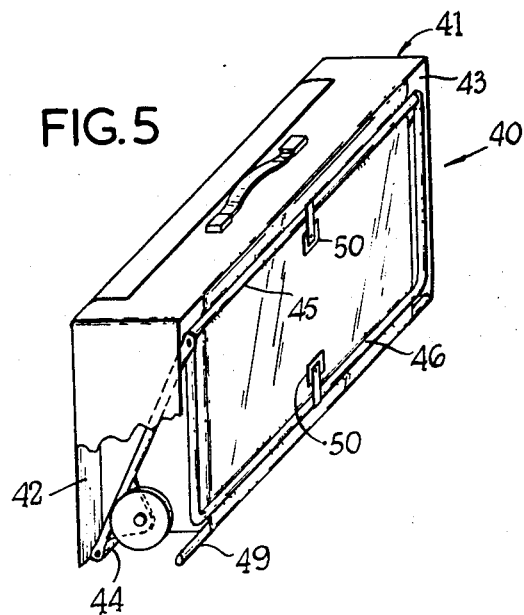
FIG.5
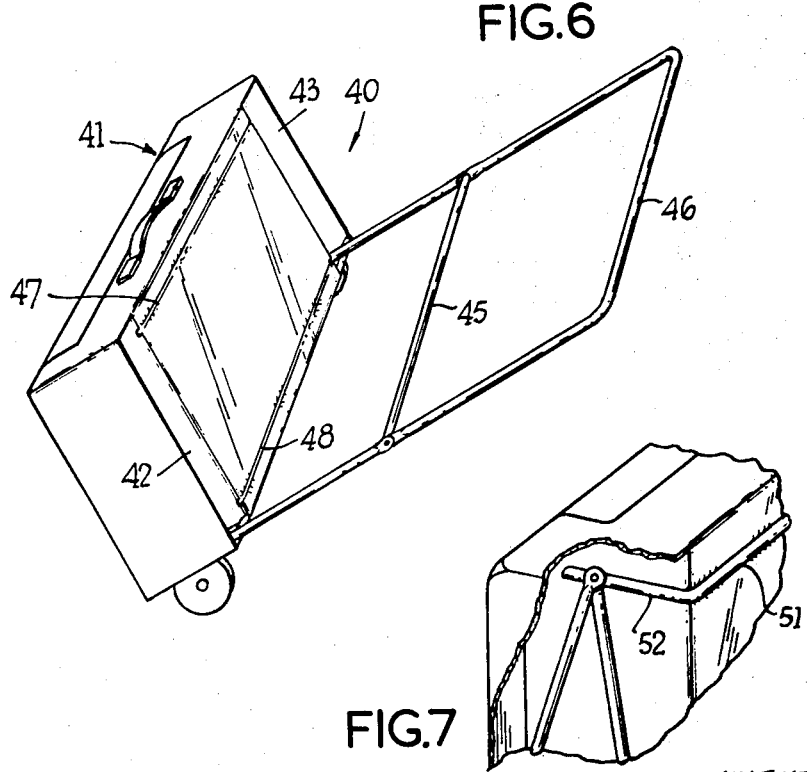
FIG.6
FIG.7
INVENTOR
KHALIL A.I. CASSIMALLY
BY
Sandoe, Hopgood & Calimafde
ATTORNEYS

TROLLEY CASE

BACKGROUND TO THE INVENTION

It is known to provide a trunk or large suitcase with a pair of wheels at one end and with a handle at the other end so that the trunk can be drawn along easily, or trundled on the wheels. In some instances it has been known to provide a trunk of this kind with wheels which fold up into the trunk when not is use. It is also known to provide upstanding lugs at the wheeled end of the trunk so that other baggage can be placed on top of the trunk.

In all of the known devices of this kind however, the wheeled trunk has been relatively large and the additional baggage has always been carried on top of the trunk itself. This has several disadvantages, namely that the wheeled trunk cannot be easily carried when not in use as a trolley and that the amount of additional luggage that can be transported is very limited.

It is an object of the present invention to overcome these disadvantages by providing a relatively small case with a wheeled framework which can be used as a trolley to carry a substantial amount of additional baggage.

STATEMENT OF THE INVENTION

According to one aspect of the present invention there is provided a collapsible trolley comprising a case and a jointed framework pivotally attached to the case, wherein the framework includes a handle and a pair of wheels and is pivotable into a closed position in which the framework is folded and located at the sides of the case and into an open position in which the wheels project below the case and the framework projects outwardly from the case in a locked condition to form a wheeled trolley with the case forming the foot of the trolley and adapted to retain in place luggage supported on the framework.

Preferably, the framework comprises two side bars each having inner and outer portions which are hinged together and a cross-bar joining the outer ends of the outer portions of the side bars, the inner portions of the side bars being pivotally mounted on the sides of the case and the wheels being fixedly mounted on the said inner portions of the side bars for pivotal movement therewith.

Preferably, also, the case is provided with recesses at each side which are open on two sides to receive and house the framework and the wheels in the closed, folded position.

DESCRIPTION OF THE DRAWINGS

FIG. 5 is a perspective view, similar to FIG. 1 but showing a modification of the trolley, FIG. 6 is a perspective view of the trolley of FIG. 5 showing the framework in the open position and FIG. 7 is a perspective view of a detail of a modification of the trolley of FIGS. 5 and 6.

DESCRIPTION OF THE PREFERRED EMBODIMENTS

Figure 1:
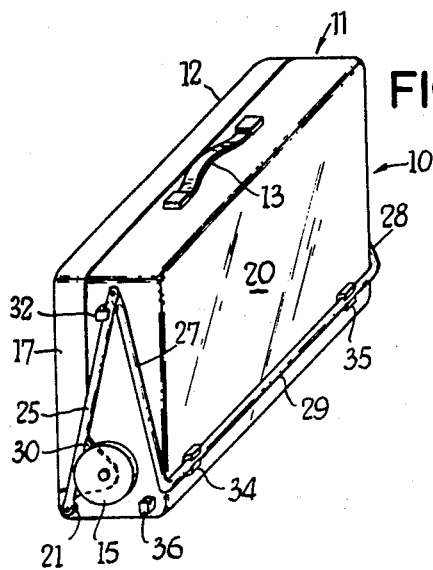
FIG. 1 is a perspective view of a collapsible trolley in accordance with the present invention showing the handle framework in a folded position.
Figure 2:
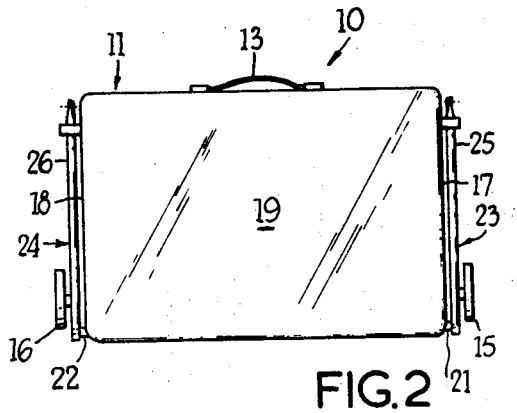
FIG. 2 is an elevation of the trolley shown in FIG. 1.

In FIGS. 1 to 4 a collapsible trolley forming one embodiment of the present invention is indicated generally at 10. The trolley 10 comprises a case 11, which forms the foot of the trolley and which is of conventional construction having a hinged lid 12 and a handle 13, and a framework 14 which carries wheels 15 and 16.

The case 11 has side faces 17 and 18 and top and bottom major faces 19 and 20. Projecting outwardly from the side faces 17 and 18 are two aligned pins 21 and 22, which can if required comprise the opposite ends of a single rod forming an integral part of the structure of the case. Alternatively, the pins 21 and 22 can be separate and each mounted in any convenient manner, on the side faces 17 and 18 of the case.

The framework 14 comprises two side bars 23 and 24 each of which comprises an inner side bar 25 and 26 respectively and an outer side bar 27 and 28 respectively. The inner side bars 25 and 26 are pivotally mounted on the pins 21 and 22 and the outer side bars 27 and 28, which are formed integrally with a handle 29, are hinged to the inner side bars 25 and 26. The wheels 15 and 16 are mounted so as to be free-running, on lugs 30 and 31 which are integral with the inner side bars 25 and 26. The wheels 15 and 16 are positioned closely adjacent the pins 21 and 22.

If the trolley 10 is not in use or is being carried by hand as a case then the framework 14 is folded away into the closed position shown in FIG. 1, in which the wheels 15 and 16 and the side bars 23 and 24 are located adjacent the side faces 17 and 18 of the case and the handle 29 extends across the bottom major face 20 of the case. Resilient clips 32 and 33 are provided on the side faces 17 and 18 respectively to hold the inner side bars 25 and 26 in the folded position and similar clips 34 and 35 are provided on the major face 20 to hold the handle 29. When the framework 14 is in the folded position the wheeled case 10 can be used as a conventional suitcase or briefcase and can be easily handled and transported.

Figure 3:
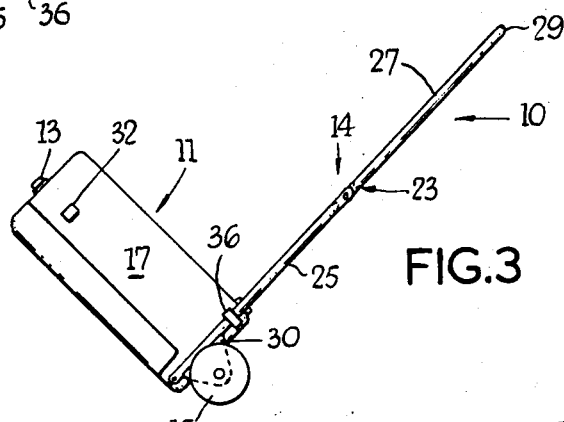
FIG. 3 is a side view of the trolley of FIGS. 1 and 2 but showing the framework in its open position.
Figure 4:
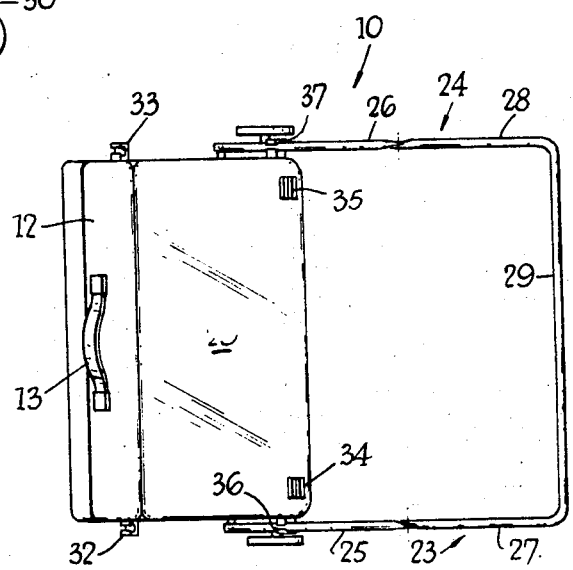
FIG. 4 is a plan view of FIG. 3.

If at any time the user wishes to transport other baggage, then the handle 29 is grasped and pulled away from the clips 34 and 35 so as to straighten the side bars 23 and 24. This action pivots the inner side bars 25 and 26 downwardly so that the wheels 15 and 16 project below the case 11 and rest on the ground. Two further clips 36 and 37 are provided on the side faces 17 and 18 of the case to engage and hold the inner side bars in the extended position shown in FIGS. 3 and 4 and the hinge joints between the inner and outer side bars are constructed in a well known manner (which is not shown) so that they lock in the straight position and can only be unlocked by jerking them into the bent position. When the framework 14 is in the locked open position, which is shown in FIGS. 3 and 4, the case 11 is supported on the free running wheels 15 and 16 and the side bars 23 and 24 and handle 29 extend outwardly and upwardly from the case 11 to form a wheeled trolley, with the case 11 forming the foot of the trolley. Other packages or baggage can then be placed on the side bars and the case 11, which forms the foot of the trolley prevents the packages from sliding off the side bars.

Thus, it will be seen that the trolley 10 provides a light, easily portable suitcase which can quickly and easily be converted into a lightweight trolley for carrying other packages or baggage.

A modification of the trolley 10 is shown in FIGS. 5 and 6 and indicated generally therein at 40. The trolley 40 is generally similar to the trolley 10 but differs in that it comprises a case 41 having side pockets 42 and 43 forming recesses, which are each open on two sides and into which the wheels and framework are folded so as to be at least partially hidden from view when not in use. The inner side bars of the framework are pivoted on the ends of a single rod 44 which forms a part of the case 41 and the framework includes a stiffening cross-bar 45 which extends transversely between the side bars of the framework at the hinge point of the inner and outer side bars.

When the wheels and framework of the trolley 40 are folded away the cross bar 45 and handle 46 seat in grooves 47 and 48 respectively formed in the bottom face of the case 41. The grooves can, if required, be part-cylindrical so as to lightly grip the cross-bar and handle to hold the framework in the folded position and sliding catches 50 are provided to hold the cross bar 45 and handle 46 in the grooves.

In order to strengthen the structure of the trolley 40, a support rod 49 is provided in the case 41 and the ends of the rod 49 extend across the side pockets 42 and 43 to act as supports for the inner side bars when the framework is in the open position shown in FIG. 6. Clips are provided (not shown) on the ends of the rod 49 to lock the inner side bars in the open position shown in FIG. 6.

In all other respects, the trolley 40 is similar to the trolley 10 of FIGS. 1 to 4.

A modification of the trolley 40 is shown in FIG. 7 in which the framework includes a U-shaped cross-bar 51, the sides 52 of which locate in the folded position along the sides of the case and in the open position within the remainder of the framework where they are held by suitable clips. In all other respects the modified trolley of FIG. 7 is similar to the trolley 40.

It will be appreciated that the structure of the trolley of the present invention must be both light in weight so that it is easily portable but strong enough to carry a substantial load. To this end the framework is preferably formed from tubular aluminum and the case which forms the foot of the trolley can have a skeletal framework, also of tubular aluminum.

What I claim is:

1. A collapsible trolley comprising a case including an openable lid forming the foot of the trolley and a jointed framework pivotally attached externally to the case, said framework including two side bars each having inner and outer portions connected together and a cross bar joining the outer ends of the outer portions of the side bars, the inner ends of said inner portions of said side bars being pivotally mounted on the sides of said case, and a pair of axles extending transversely of and fixedly mounted on the inner portions of said side bars at a location spaced from said inner ends of said inner portions, a pair of wheels respectively pivotably mounted on said pair of axles for pivotal movement therewith, and means for selectively holding said framework in closed and opened positions, whereby the framework is pivotable into a closed position in which said side bars are collapsed and located at the sides of said case and said cross bar extends across a major face of said case and is pivotable into an opened position in which said wheels project below the case and said side bars project outwardly substantially normally from said major surface of said case in a locked condition to form a wheeled trolley with the case forming the foot of the trolley and adapted to retain luggage in place on the side bars of said framework.

2. A trolley as claimed in claim 1, wherein the inner portion of each side bar is pivotally mounted on a side of the case adjacent a bottom corner thereof and a fastener element is provided at the adjacent bottom corner of the side of the case for locking the inner portion of the side bar in the open position.

3. A trolley as claimed in claim 2, wherein a transverse stiffening bar is provided between the side bars at or adjacent to the hinge points of the inner and outer portions of the side bars, the transverse bar locating across the upper end of a major face of the case and the cross bar locating across the bottom end of the same major face of the case when the framework is in the closed, folded position.

4. A trolley as claimed in claim 3, wherein grooves are provided in the said major face of the case to accommodate the transverse bar and the cross bar.

5. A trolley as claimed in claim 4, wherein the cross bar is U-shaped.

6. A trolley as claimed in claim 5, wherein the case is provided with recesses at each side which are open on two sides to receive and house the framework and the wheels in the closed, folded position.

7. A trolley as claimed in claim 1, wherein the case is provided with recesses at each side which are open on two sides to receive and house the framework and the wheels in the closed, folded position.

* * * * *